UNITED STATES PATENT OFFICE 2,445,699

MANUFACTURE OF 2-ANTHRAHYDROQUINONE-CARBOXYLIC ACID

Alvin J. Sweet, East Aurora, N. Y., assignor to Allied Chemical and Dye Corporation, New York, N. Y., a corporation of New York No Drawing. Application October 9, 1946, Serial No. 702,085

5 Claims. (Cl. 260—376)

This invention relates to the manufacture of 2-anthrahydroquinone-carboxylic acid, and relates particularly to an improved method of reducing 2-anthraquinone-carboxylic acid by means of hydrosulfite.

To produce the leuco form an anthraquinone-carboxylic acid is customarily reduced with sodium hydrosulfite in aqueous alkaline solution. Thereafter the reaction mass is acidified, usually with mineral acid, to precipitate the leuco compound which is then separated by filtration in the usual manner. In the case of 2-anthraquinone-carboxylic acid this method yields poor results, probably because the sparingly- soluble nature of the sodium salt of this acid in alkaline solution hinders the reaction of the salt with the reducing agent. The 2-anthrahydroquinone-carboxylic acid obtained by alkaline reduction has a fluffy, bulky physical structure. In aqueous suspension containing as little as 2% solids (by weight), the reduction product forms a thick, pasty slurry which is difficult to agitate and filter, and yields a filter cake which is bulky, retains large amounts of liquid, and in the wet state readily oxidizes on exposure to air even at room temperature. To avoid excessive oxidation of this leuco form during drying, the bulky filter cake must not undergo more than limited exposure to air and must be dried in vacuo; during drying, the material must be broken up repeatedly to prevent formation of dry, partially oxidized "skins" which inhibit the drying of the underlying leuco compound. These disadvantages in the alkaline reduction process necessitate small batches, long process cycles, and special handling and drying precautions, which in the aggregate result in a relatively high cost of manufacture.

It is an object of the present invention to provide an improved process for the manufacture of 2-anthrahydroquinone-carboxylic acid by means of hydrosulfite. A further object is to provide a reduction process which can be conducted at relatively high concentrations without special handling equipment. A further object is to provide a product in such form that filtration and draining are rapid, efficient, and relatively complete. A further object is to provide a product which is less readily oxidized by contact with air and which, as a result of this property, plus its excellent drainage characteristics, can be worked up without special precautions to prevent access of air.

In accordance with the present invention, 2-anthraquinone-carboxylic acid is reacted with an aqueous hydrosulfite reducing solution at a pH of less than 5.

By maintaining the hydrosulfite reducing solution sufficiently acid, the 2-anthraquinone-carboxylic acid and its reduction product are retained substantially entirely in solid phase and it is possible to effect the reduction at substantially greater concentrations of anthraquinone-carboxylate, and to obtain a product which is substantially denser, more readily handled, more rapidly precipitated or filtered, and otherwise improved with respect to its physical properties as compared to the product obtainable by the previous alkaline reduction in which the reduction product is produced in the form of an aqueous solution of the alkali-metal salt.

The reduction may be carried out satisfactorily with ratios of anthraquinone-carboxylic acid to water between 3% and 10% by weight. The concentration is not critical and concentrations outside this range may be used. However, concentrations of anthraquinone carboxylic acid in excess of the range specified result in very thick slurries and with such concentrations it is advisable to use equipment especially adapted for handling heavy slurries. Concentrations below the range specified merely increase the bulk of the reaction mixture and reduce the capacity of the equipment for production of finished product. A suspension of about 6 parts of anthraquinone-carboxylic acid per 100 parts by weight of water provides the preferred concentration.

The amount of hydrosulfite used may be varied in accordance with the desired degree of reduction of the 2-anthraquinone-carboxylic acid. For some purposes (for example, to accelerate the bodying of linseed oil by boiling) a mixture consisting of 2-anthraquinone-carboxylic acid and its leuco compound, such as the product of Example 2 below, is suitable and effective. For purposes of dyestuff manufacture, when a more complete reduction is desirable, the stoichiometric or a greater amount of hydrosulfite may be used. In all cases the acid reduction is rapid and the 2-anthrahydroquinone-carboxylic acid is less bulky, more filterable and less prone to air oxidation than the alkaline-reduced product.

It is preferred to conduct the reduction with hydrosulfite at a solution pH between 0.1 and 4.5 and at a temperature between 50° C. and 70° C., and especially between 60° C. and 70° C. in order to obtain a rapid reduction and provide a product of most satisfactory physical character.

The following examples further illustrate the invention. Proportions are in terms of weight unless otherwise indicated.

Example 1

A mixture of 100 parts of 2-anthraquinone-carboxylic acid and 1650 parts of water was heated with agitation to about 60° C. and to the agitated slurry 50 parts of sodium hydrosulfite (anhydrous) was added in a period of about one minute. The solution pH was approximately 4.2 at both the beginning and end of the addition. The white color of the slurry changed immediately to a dark color which proceeded gradually from brown to greenish-black at the end of the hydrosulfite addition. The slurry was then cooled to 30° C. and filtered. The filter cake was washed with 200 parts of water. Both filtering and washing occupied a total time of one minute. The filter cake, weighed immediately without drying, amounted to 290 parts containing 98 parts of product (dry basis).

The same process was carried out by adding an aqueous solution of 50 parts of sodium hydrosulfite and 100 parts of sodium hydroxide in 1000 parts of water to the carboxylic acid slurry. However, when the process was carried out with less than 4800 parts of water the final acid slurry was so thick that it could not be handled and hence in this instance 4800 parts of water was employed instead of the 1650 parts employed in the acid reaction to secure a fluid slurry. Except as indicated the reduction was carried out in just the same manner as before. At the end of the reduction, the solution of the product was acidified with aqueous 20° Bé. (32%) muriatic acid to a pH of 1.5 to precipitate the 2-anthrahydroquinone-carboxylic acid. The resulting slurry was then filtered as in the case of the acid reduction. However, filtration was so slow that 1¾ hours was required for filtration and washing, as compared to one minute for the acid-reduced product. The filter cake, after filtering and washing, amounted to 1350 parts containing 98 parts of product (dry basis). Thus the filter-cake contained over 1000 parts more of water than the filter-cake obtained in the acid-reduction process.

Example 2

An aqueous paste containing 62 parts of finely divided 2-anthraquinone-carboxylic acid was stirred into about 1000 parts of water. The mixture was agitated and heated to about 60° C. To the warm slurry, 31 parts of sodium hydrosulfite was added. The white or cream color of the slurry immediately changed to a dark color ranging from brown to greenish-black, as is customary in this reduction. The slurry was then cooled to 30° C. and filtered. The filtration was rapid and the filter cake comprising 2-anthrahydroquinone-carboxylic acid and unreduced 2-anthraquinone-carboxylic acid was dense, but was porous enough to let mother liquor and water washes pass through it readily. The cake containing about 25% solids was dried below 70° C. in an air drier. The dry product was soluble in aqueous caustic soda, thus showing that it was chiefly the leuco form of the 2-anthraquinone-carboxylic acid.

Example 3

123 parts of an aqueous paste of 2-anthraquinone-carboxylic acid, which by analysis contained 39% of the acid, was suspended in 1000 parts of water. To the resulting uniform agitated slurry, heated to about 60° C., 42 parts sodium hydrosulfite (anhydrous) was added. The mixture rapidly turned black and finally changed to a grayish-brown slurry, which was cooled to about 30° C., and filtered. The precipitate formed a dense, compact, porous filter cake, which was easily washed with cold water until the washings were free from inorganic salts. The filter cake was then dried in an air oven at a temperature slightly below 65° C. The dry product (44 parts) was a light-gray solid, soluble in dilute aqueous caustic soda, to yield a red solution which, on standing, oxidized to a white precipitate.

In a melting point tube, the product changed at a temperature between 150° C. and 170° C. from a gray to a light yellow compound which melted at about 275° C. and was no longer soluble in aqueous caustic soda, thus showing that on heating, the leuco compound had oxidized to 2-anthraquinone-carboxylic acid.

I claim:

1. The method of making 2-anthrahydroquinone-carboxylic acid, which comprises reacting 2-anthraquinone-carboxylic acid with aqueous hydrosulfite reducing solution at a pH of less than 5.

2. The method of making 2-anthrahydroquinone-carboxylic acid, which comprises reacting 2-anthraquinone-carboxylic acid with aqueous hydrosulfite reducing solution at a temperature between 50° and 70° C. at a pH sufficiently low to prevent solution of a substantial proportion of the 2-anthrahydroquinone carboxylic acid product.

3. The method of making 2-anthrahydroquinone-carboxylic acid directly in solid phase, which comprises agitating 2-anthraquinone-carboxylic acid in aqueous hydrosulfite reducing solution at a pH of less than 5, the ratio of carboxylic acid to water being between 3% and 10%.

4. The method of making 2-anthrahydroquinone-carboxylic acid directly in solid phase, which comprises agitating 2-anthraquinone-carboxylic acid in aqueous hydrosulfite reducing solution at a pH of less than 5 and at a temperature between 50° and 70° C., the ratio of the carboxylic acid to water being between 3% and 10%.

5. The method of making 2-anthrahydroquinone-carboxylic acid directly in solid phase, which comprises agitating 2-anthraquinone-carboxylic acid in aqueous hydrosulfite reducing solution at a pH between $\tfrac{1}{6}$ and 4½ at a solution temperature between 50° and 70° C., the ratio of the carboxylic acid to water being between 3% and 10%.

ALVIN J. SWEET.

REFERENCES CITED

The following references are of record in the file of this patent:

Fierz-David "Kunstliche Organische Farbstoffe" (1926) page 691.